(12) United States Patent
Hubbard et al.

(10) Patent No.: US 8,807,407 B2
(45) Date of Patent: Aug. 19, 2014

(54) CLAMPING ASSEMBLY FOR A ROOF BOX CARRIER HAVING AN ADJUSTMENT MECHANISM

(75) Inventors: Peter Douglas Hubbard, Christchurch (NZ); Bruce John Robertson, Christchurch (NZ)

(73) Assignee: Yakima Innovation Development Corporation, Georgetown, Grand Cayman (KY)

( * ) Notice: Subject to any disclaimer, the term of this patent is extended or adjusted under 35 U.S.C. 154(b) by 0 days.

(21) Appl. No.: 13/821,890

(22) PCT Filed: Sep. 8, 2011

(86) PCT No.: PCT/NZ2011/000184
§ 371 (c)(1),
(2), (4) Date: Jul. 26, 2013

(87) PCT Pub. No.: WO2012/033419
PCT Pub. Date: Mar. 15, 2012

(65) Prior Publication Data
US 2013/0292436 A1    Nov. 7, 2013

(30) Foreign Application Priority Data

Sep. 8, 2010   (NZ) .................................. 587860

(51) Int. Cl.
*B60R 9/058*        (2006.01)
(52) U.S. Cl.
USPC ........................................ 224/321; 224/319
(58) Field of Classification Search
USPC ................................................ 224/319, 321
See application file for complete search history.

(56) References Cited

U.S. PATENT DOCUMENTS

| | | | | |
|---|---|---|---|---|
| 3,334,197 A | * | 8/1967 | Boden et al. | 191/40 |
| 3,581,962 A | * | 6/1971 | Osborn | 224/319 |
| 3,685,061 A | * | 8/1972 | Wray | 5/119 |
| 4,911,348 A | * | 3/1990 | Rasor et al. | 224/321 |
| 5,357,643 A | * | 10/1994 | Seals | 7/138 |
| 5,673,925 A | * | 10/1997 | Stewart | 280/279 |
| 5,730,343 A | * | 3/1998 | Settelmayer | 224/321 |
| 6,164,507 A | * | 12/2000 | Dean et al. | 224/324 |
| 6,918,521 B2 | | 7/2005 | Settelmayer | |

(Continued)

FOREIGN PATENT DOCUMENTS

| | | |
|---|---|---|
| AU | 71505/96 | 4/1997 |
| EP | 0852546 | 7/1998 |

(Continued)

OTHER PUBLICATIONS

International Searching Authority of the Australian Patent Office regarding PCT Application No. PCT/NZ2011/000184, International Search Report dated Sep. 8, 2011, 3 pages.

(Continued)

*Primary Examiner* — Brian D Nash
(74) *Attorney, Agent, or Firm* — Kolisch Hartwell, P.C.

(57) ABSTRACT

The application relates to an adjustment mechanism for altering the position of roof box clamps and/or the roof box position on a vehicle. Adjustment of the roof box position relative to a vehicle may be completed without unclamping the roof box from the vehicle roof rack or racks. The clamp or clamps may also be positioned easily relative to roof rack positions prior to fitting.

14 Claims, 6 Drawing Sheets

(56) References Cited

U.S. PATENT DOCUMENTS

| | | |
|---|---|---|
| 7,357,283 B2 * | 4/2008 | Settelmayer ............... 224/322 |
| 7,416,098 B2 | 8/2008 | Settelmayer |
| 7,419,074 B2 | 9/2008 | Kamiya |
| 7,503,470 B2 | 3/2009 | Settelmayer |
| 8,074,851 B2 | 12/2011 | Settelmayer |
| 2003/0085247 A1 * | 5/2003 | Allen et al. ............... 224/321 |
| 2004/0155081 A1 | 8/2004 | Settelmayer |
| 2004/0256427 A1 | 12/2004 | Settelmayer |
| 2005/0051585 A1 | 3/2005 | Kamiya et al. |
| 2006/0032878 A1 | 2/2006 | Settelmayer |
| 2009/0014489 A1 | 1/2009 | Settelmayer |
| 2010/0084447 A1 * | 4/2010 | Elliott et al. ............... 224/319 |
| 2010/0237116 A1 * | 9/2010 | Hubbard ............... 224/309 |

FOREIGN PATENT DOCUMENTS

| | | |
|---|---|---|
| EP | 1592581 | 12/2007 |
| GB | 2414459 | 7/2006 |
| JP | 11512676 | 11/1999 |
| JP | 2004161170 | 6/2004 |
| SE | 504606 | 3/1997 |
| WO | 9711864 | 4/1997 |
| WO | 2004067326 | 8/2004 |

OTHER PUBLICATIONS

International Preliminary Examining Authority of the Australian Patent Office regarding PCT Application No. PCT/NZ2011/000184, "Notification of Transmittal of International Preliminary Report on Patentability" dated Aug. 31, 2012, 10 pages.

* cited by examiner

CLAMPING ASSEMBLY FOR A ROOF BOX CARRIER HAVING AN ADJUSTMENT MECHANISM

RELATED APPLICATIONS

This application claims priority from NZ587860 dated 8 Sep. 2010, the contents of which are incorporated herein by reference.

TECHNICAL FIELD

The application relates to an adjustment mechanism. More specifically, the application relates to an adjustment mechanism for adjusting the position of a vehicle roof box relative to the vehicle roof rack crossbars or for adjusting the position of a roof box clamp assembly or assemblies relative to a roof box.

BACKGROUND ART

Roof boxes are well known and commercialised worldwide. Roof boxes comprise a container mountable to a roof area of a vehicle and are adapted to store luggage, cargo and/or other objects (e.g. sporting equipment such as skis and snowboards). Typically, the roof box is made up of a bottom section for mounting to the roof area of a vehicle and a top section movable relative to the bottom section for opening and closing the roof box. Roof boxes may be preferable to an open roof rack accessory holder since they protect the items stored inside from exposure to adverse weather and environmental conditions as well as provide robust protection against theft and vandalism.

There are a wide range of different styles, features and prices available although roof boxes have become very standardised in design. In particular, typical design features common to many designs include central locking, double sided opening, quick fit attachment from inside the roof box, the ability to fit a range of roof racks and various styling shapes.

One drawback noted above of roof box designs is that the roof box clamping assembly is achieved via one or more assemblies that can only be reached via the interior of the roof box. Drawbacks include having to remove the roof box contents in order to access the clamping assembly. Secondly, the clamping assembly when mounted on a vehicle can be difficult to reach, particularly if the vehicle has a relatively high ground clearance. A further issue of art designs is that it is not possible to adjust the position of the roof box on vehicle cross bars without having to access the interior of the roof box and loosen the entire box from the cross bars. A yet further issue is that it is not possible to adjust the position of the clamp assembly without needing to access the interior of the roof box.

It is acknowledged that the term 'comprise' or grammatical variations thereof may be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements.

Further aspects and advantages of the present invention will become apparent from the ensuing description that is given by way of example only.

SUMMARY

The application broadly relates to a roof box with a an adjustment mechanism that allows the user to both quickly datum the spread of the roof box clamps relative to roof rack cross bars and to easily adjust the position of the box relative to the clamps/cross bars all without having to access the interior of the roof box or, in the case of adjusting the roof box position, not having to loosen the clamps from the cross bars.

In a first aspect there is provided a roof box including at least one clamping assembly and at least one adjustment mechanism for clamping the roof box to a roof rack wherein:
  a. the at least one clamping assembly engages a roof box to at least one roof rack cross bar on a vehicle; and
  b. the at least one adjustment mechanism includes at least one actuator accessed from the exterior of the roof box that releasably engages and disengages the clamp assembly from the roof box; and
wherein, when the actuator or actuators are disengaged, the clamp assembly and/or roof box may be moved along the length of the roof box base and, when the actuator is engaged, the clamp assembly is fixed in position to the roof box.

As noted above, the adjustment mechanism may be disengaged to effect a change in position of the clamp assembly along the base of the roof box. In this aspect, movement of the clamp assembly may be in the longitudinal direction of the roof box.

In an alternative aspect, the adjustment mechanism may be disengaged to allow the roof box to be moved relative to the vehicle cross bar or bare. In this aspect, movement of the roof box may be in the longitudinal direction of the roof box.

In a second aspect there is provided a method of adjusting the position of at least one roof box clamp assembly relative to a roof box by use of an adjustment mechanism including:
  a. at least one clamping assembly that engages a roof rack crossbar on a vehicle; and
  b. at least one adjustment mechanism with at least one actuator accessed from the exterior of the roof box that releasably engages and disengages the clamp assembly from the roof box; and
wherein, when the actuator or actuators are disengaged, the clamp assembly or assemblies can be moved along the length of the roof box and when the actuator or actuators are engaged, the clamp assembly or assemblies are again fixed to the roof box.

In the above aspect, movement of the clamp assembly may be in the longitudinal direction of the roof box.

In a third aspect there is provided a method of adjusting the position of a roof box relative to at least one vehicle cross bar by use of an adjustment mechanism including:
  a. at least one clamping assembly that engages a roof rack crossbar on a vehicle; and
  b. at least one adjustment mechanism with at least one actuator accessed from the exterior of the roof box that releasably engages and disengages the clamp assembly from the roof box; and
wherein, when the actuator or actuators are disengaged, the clamp assembly or assemblies remain clamped to the cross bar or bars and the roof box may be moved along the length of the roof box and when the actuator or actuators are engaged, the clamp assembly or assemblies are again fixed to the roof box.

In the above aspect, movement of the roof box may be in the longitudinal direction of the roof box.

Advantages of the adjustment mechanism include ease of adjustment of the roof box clamps/clamp assembly relative to the vehicle cross bars and secondly, ease of adjustment of the lateral position of the roof box on a vehicle once the roof box has been attached to at least one cross bar on the vehicle. A particular advantage is that the adjustment mechanism may be accessed from the exterior of the roof box avoiding the need to access the inside of the roof box.

BRIEF DESCRIPTION OF THE DRAWINGS

Further aspects of the application will become apparent from the following description that is given by way of example only and with reference to the accompanying drawings in which:

FIG. 6 illustrates a cross section view of the clamp and adjustment mechanism in an open position along with the roof box extrusion to which the clamp is attached to;

DETAILED DESCRIPTION

As noted above, the application broadly relates to a roof box with a an adjustment mechanism that allows the user to both quickly datum the spread of the roof box clamps relative to roof rack cross bars and to easily adjust the position of the box relative to the clamps/cross bars all without having to access the interior of the roof box or, in the case of adjusting the roof box position, not having to loosen the clamps from the cross bars.

In a first aspect there is provided a roof box including at least one clamping assembly and at least one adjustment mechanism for clamping the roof box to a roof rack wherein:
 a. the at least one clamping assembly engages a roof box to at least one roof rack cross bar on a vehicle; and
 b. the at least one adjustment mechanism includes at least one actuator accessed from the exterior of the roof box that releasably engages and disengages the clamp assembly from the roof box; and
wherein, when the actuator or actuators are disengaged, the clamp assembly and/or roof box may be moved along the length of the roof box base and, when the actuator is engaged, the clamp assembly is fixed in position to the roof box.

For further clarification, the term 'roof rack' refers to a linkage assembly between the roof box and a vehicle roof. In one embodiment, the roof box may clamp to the roof rack via cross bars.

The term 'cross bar' or 'cross bars' refers to a bar or bars that extend across the vehicle roof and face into the wind when the vehicle is moving.

As noted above, the adjustment mechanism may be disengaged to effect a change in position of the clamp assembly along the base of the roof box. In this aspect, movement of the clamp assembly may be in the longitudinal direction of the roof box.

In an alternative embodiment, the adjustment mechanism may be disengaged to allow the roof box to be moved relative to the vehicle cross bar or bars. In this aspect, movement of the roof box may be in the longitudinal direction of the roof box.

In the above aspect, when the adjustment mechanism is actuated to disengage the clamp assembly from the roof box, the roof box remains clamped to the roof rack or racks.

In one embodiment, at least one channel in the roof box may be used to house the clamp assembly or assemblies and adjustment mechanism(s) and the clamp body may slidably engage the channel and move back and forth along the channel enclosure and fixedly engaged in a desired position along the channel via the adjustment mechanism. In a further embodiment, the channel may house an extruded bar to which the clamp assembly and/or adjustment mechanism may be attached to. As may be appreciated, this movement is useful to allow for variations in roof rack cross bar spacing thereby allowing the roof box clamping assembly to be used on almost any roof rack cross bar spacing.

As noted above, the adjustment mechanism includes an actuator. The actuator may be a lever accessed by a user from the exterior of the roof box. Optionally, the actuator may be integral to and accessed from the clamp assembly.

In one aspect, the adjustment mechanism includes an actuator as described above with a cammed surface such that when the actuator is closed, the cammed surface engages the roof box e.g. via the extrusion bar and via an over centre arrangement on the cammed surface that retains the clamp assembly against the roof box. In a further aspect the cammed surface engages and forces a friction pad against an extrusion bar and an opposing face pad thereby engaging and retaining the clamp assembly against the roof box.

In a further aspect, the cammed surface and actuator as a whole may be housed within the clamp assembly housing and wherein the housing includes a rocker arm for the adjustment mechanism that creates a moment forcing the actuator to either a locked or unlocked position.

Optionally, the clamping assembly including the adjustment mechanism, may be housed within the base section of the roof box and the only externally viewed features of the clamping assembly beyond the roof box exterior may be the clamp assembly housing and clamp or clamps.

It should be appreciated that by minimising the visual impact of the clamping assembly, the aesthetics of the roof box are maintained including keeping an aerodynamic and smooth external profile.

In a second aspect there is provided a method of adjusting the position of at least one roof box clamp assembly relative to a roof box by use of an adjustment mechanism including:
  a. at least one clamping assembly that engages a roof rack crossbar on a vehicle; and
  b. at least one adjustment mechanism with at least one actuator accessed from the exterior of the roof box that releasably engages and disengages the clamp assembly from the roof box; and
wherein, when the actuator or actuators are disengaged, the clamp assembly or assemblies can be moved along the length of the roof box and when the actuator or actuators are engaged, the clamp assembly or assemblies are again fixed to the roof box.

In the above aspect, movement of the clamp assembly may be in the longitudinal direction of the roof box.

In a third aspect there is provided a method of adjusting the position of a roof box relative to at least one vehicle cross bar by use of an adjustment mechanism including:
  a. at least one clamping assembly that engages a roof rack crossbar on a vehicle; and
  b. at least one adjustment mechanism with at least one actuator accessed from the exterior of the roof box that releasably engages and disengages the clamp assembly from the roof box; and
wherein, when the actuator or actuators are disengaged, the clamp assembly or assemblies remain clamped to the cross bar or bars and the roof box may be moved along the length of the roof box and when the actuator or actuators are engaged, the clamp assembly or assemblies are again fixed to the roof box.

In the above aspect, movement of the roof box may be in the longitudinal direction of the roof box.

The above method may include variations in the adjustment mechanism substantially as hereinbefore described.

The above described roof box adjustment mechanism is now described by reference to a working example illustrating one aspect and variations thereof.

WORKING EXAMPLE

The application is now described with reference to a detailed description of various embodiments of the roof box adjustment mechanism of the present invention.

The adjustment mechanism 1 may be used in one of two ways.

Figure 1:
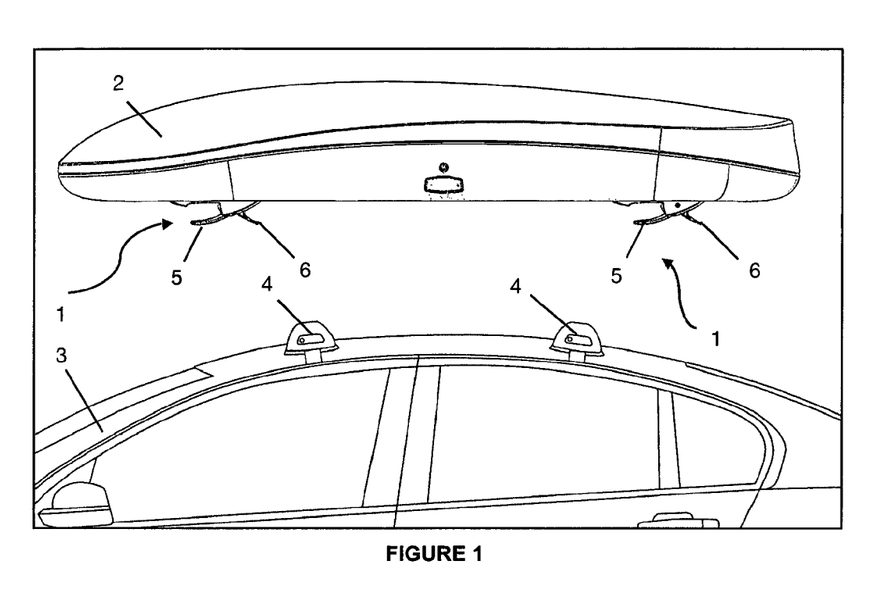
FIG. 1 illustrates an example of the roof box clamps and adjustment mechanism in an open position adjusted to a maximum width apart.
Figure 2:
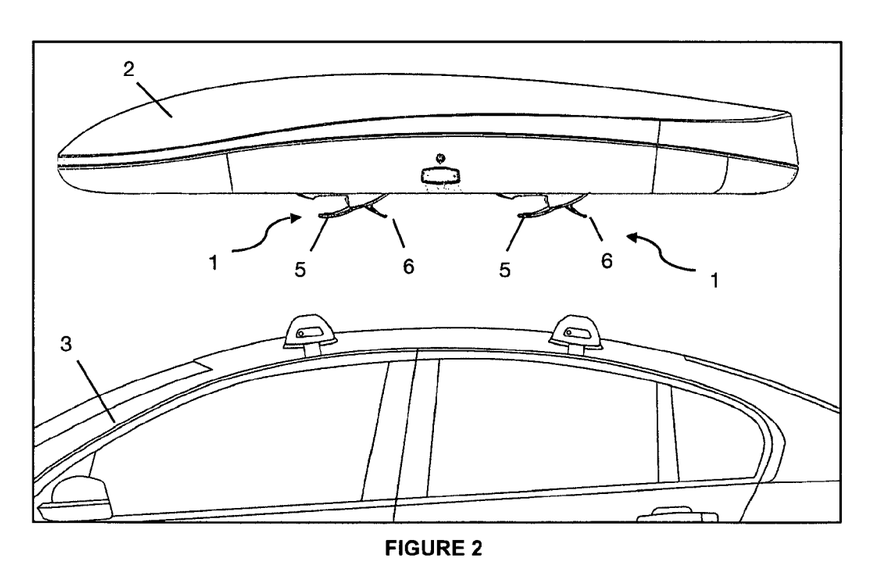
FIG. 2 illustrates an example of the roof box clamps and adjustment mechanism in an open position adjusted to a minimum width apart.

The first is before fitting the roof box 2 to the vehicle 3 cross bars 4 illustrated in FIGS. 1 and 2. This might be done the first time the roof box 2 is fitted to the vehicle 3. The roof box 2 clamps 5 and adjustment actuator 6 are opened and the spread of the clamps 5 adjusted until the desired width is reached i.e. sufficient spread for the clamps 5 to engage the crass bars 4. FIG. 1 illustrates how the clamps 5 may be spilt apart almost to the width of the roof box 2 while FIG. 2 illustrates the other extreme with the clamps 5 positioned close together. It is anticipated that the spread will be in a more neutral position to the extremes illustrated however, the drawings show the extent of movement possible via the adjustment mechanism 1. It should be appreciated that having a wide degree of flexibility in the spread of the clamps 5 may be useful as almost all vehicles 3 have variations in the position of the cross bars 4 hence an adjustment mechanism 1 means that essentially one roof box 2 can be adjusted to fit any vehicle 3.

Figure 3:
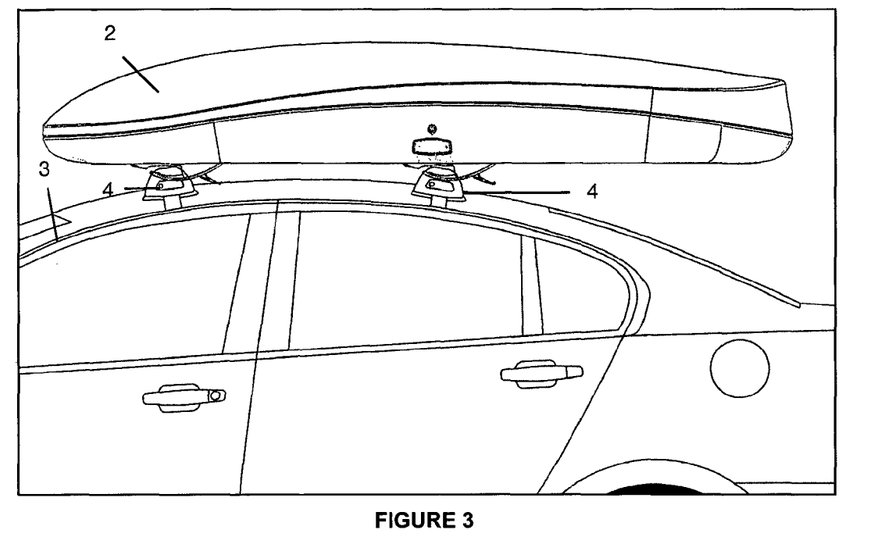
FIG. 3 illustrates an example of the roof box clamps closed and attached to cross bars with the adjustment mechanism open and the roof box position shifted laterally backwards to a maximum position relative to the racks and vehicle.
Figure 4:
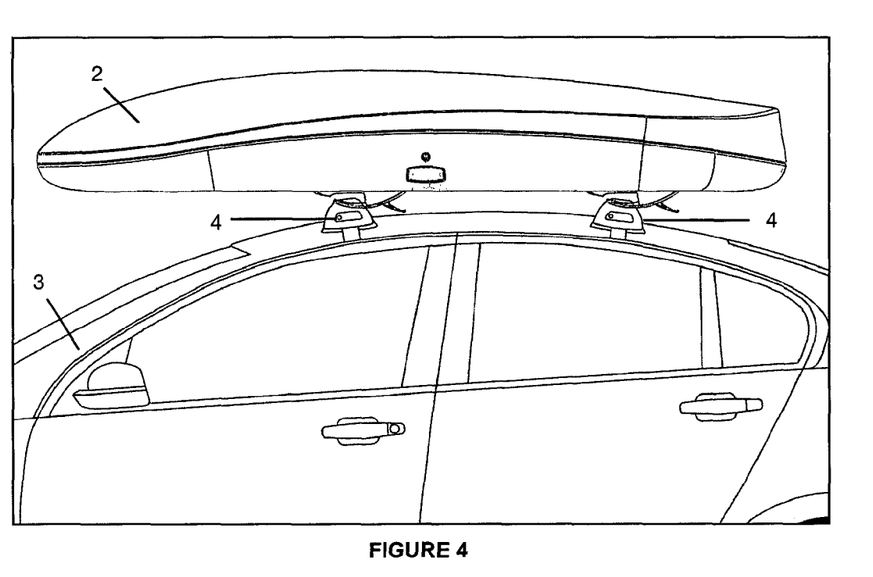
FIG. 4 illustrates an example of the roof box clamps closed and attached to cross bars with the adjustment mechanism open and the roof box position shifted laterally forwards to a maximum position relative to the racks and vehicle.
Figure 5:
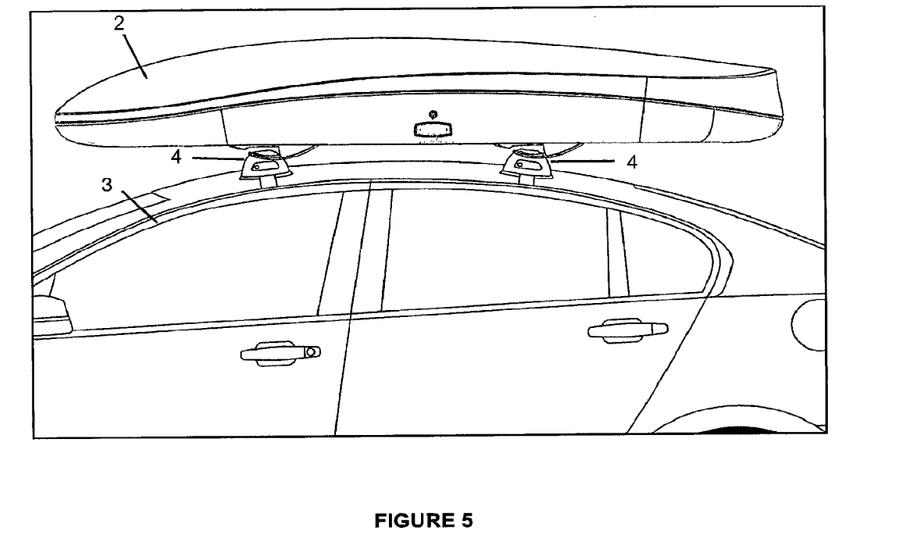
FIG. 5 illustrates an example of the roof box clamps dosed and attached to cross bars with the adjustment mechanism also closed and the roof box position in a neutral position laterally relative to the racks end vehicle.

The second method of use is where the clamps 5 are already fixed to the cross bars 4 and the adjustment mechanism 1 is opened to shift the roof box 2 forwards or backwards relative to the cross bars 4 and vehicle 3. Re-positioning may be done for aesthetic reasons or for physical reasons, for example to allow clearance for the hatch door (not shown) of a vehicle 3 to open. As shown in FIGS. 3 to 5, movement in this second method is achieved by opening the adjustment actuators 6 and sliding the box 2 forwards or backwards as desired relative to the clamps 5, cross bars 4 and vehicle 3. Once re-positioned, the adjustment actuators 6 may be closed and in doing so, the box 2 is locked into the new position. FIG. 3 illustrates one rear most extreme position. FIG. 4 illustrates one forward most extreme position. FIG. 5 illustrates the roof box 2 locked into position post adjustment.

FIGS. 6 to 9 illustrate more detail of the adjustment mechanism 1. While the adjustment mechanism 1 is illustrated integral to the clamp 5 housing 7, other arrangements may be possible such as a separate housed mechanism (not shown) without departing from the scope of the invention.

Figure 6:
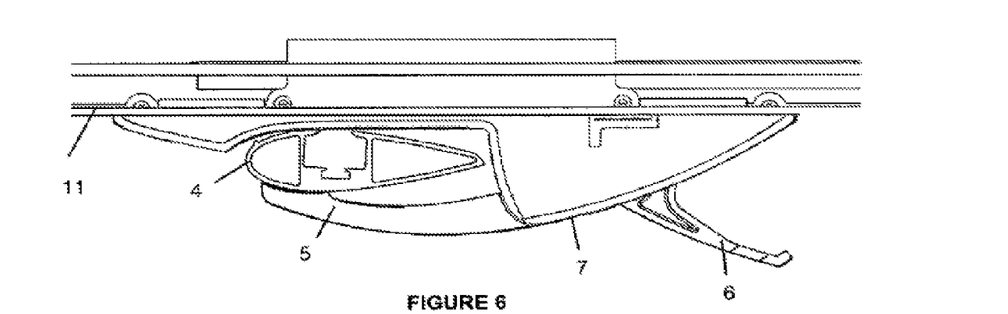
Figure 7:
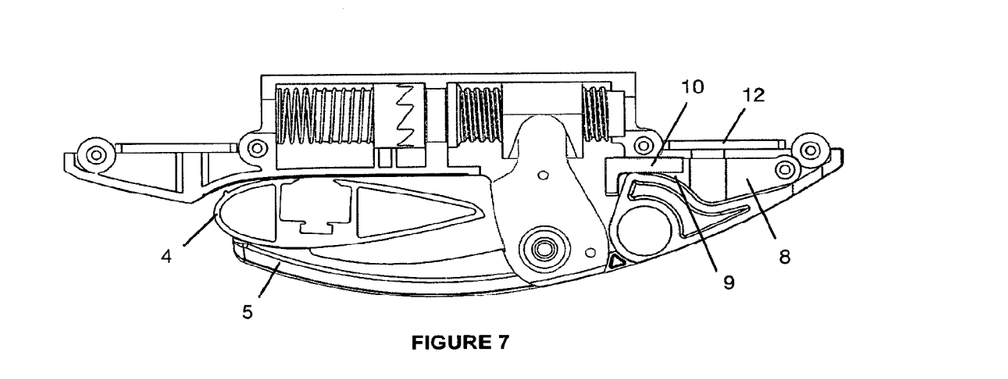
FIG. 7 illustrates a cross section view of the clamp and adjustment mechanism in a closed position with the extrusion and other detail removed.
Figure 8:
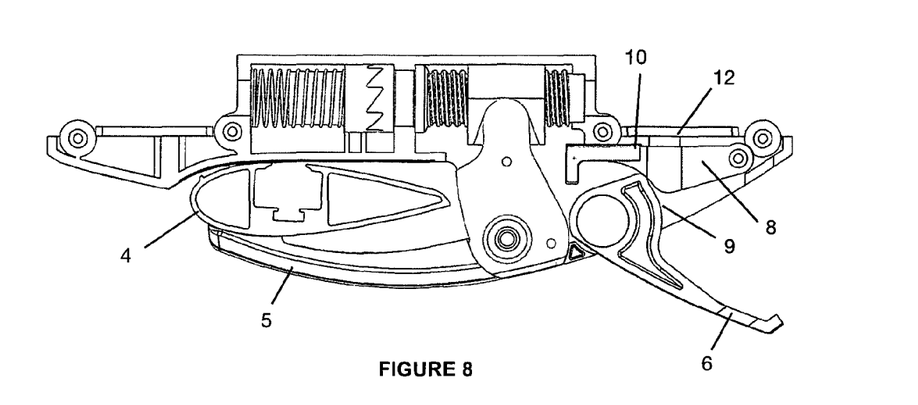
FIG. 8 illustrates a cross section view of the clamp and adjustment mechanism in an open position with the extrusion and other detail removed.
Figure 9:
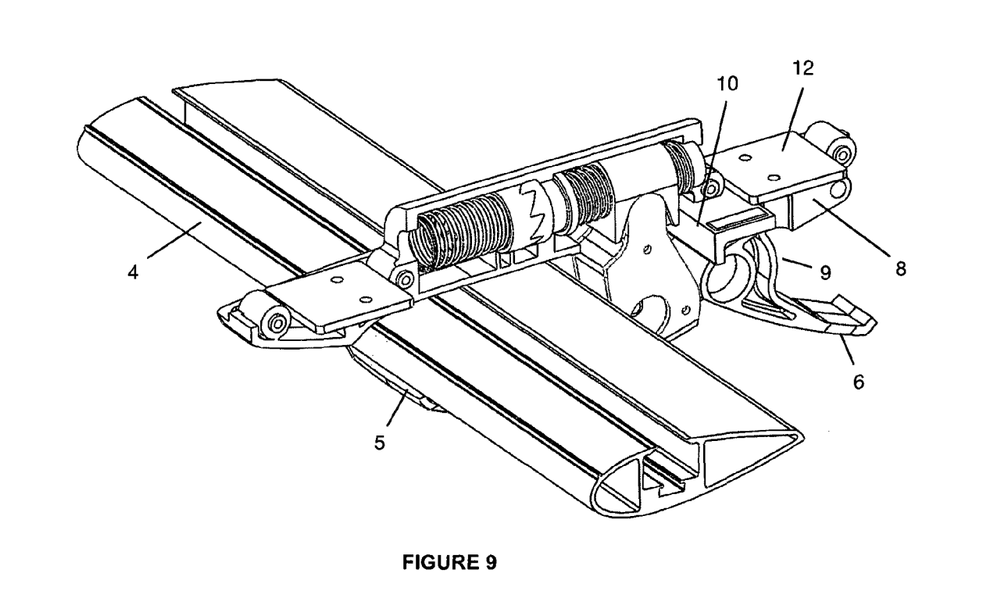
FIG. 9 illustrates a cross section perspective view of the clamp and adjustment mechanism in an open position with the extrusion and other detail removed.
Figure 10:
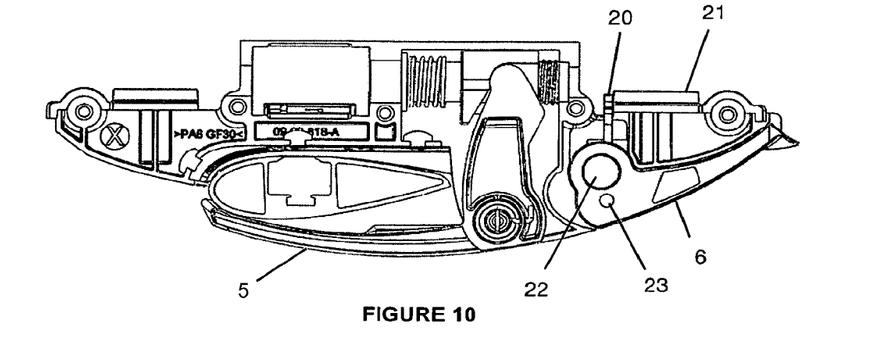
FIG. 10 illustrates a cross section view of the clamp and adjustment mechanism in a closed position with the extrusion and other detail removed in an alternative aspect.
Figure 11:
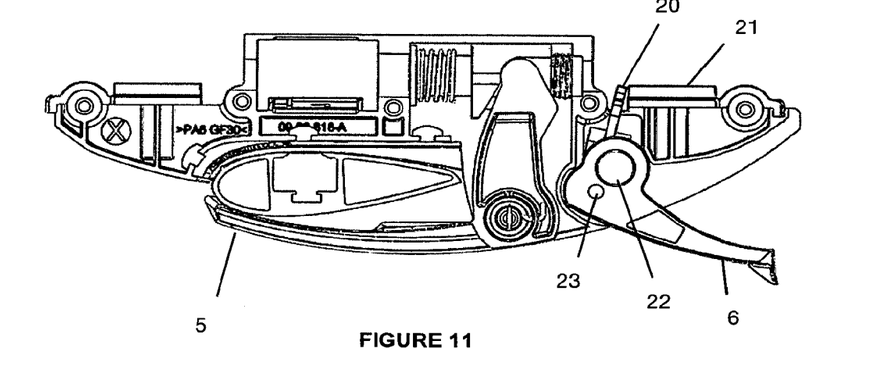
FIG. 11 illustrates a cross section view of the clamp and adjustment mechanism in an open position with the extrusion and other detail removed in an alternative aspect.
Figure 12:
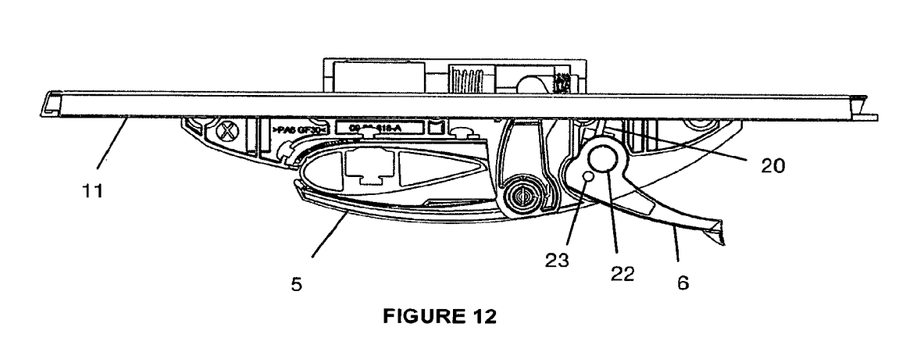
FIG. 12 illustrates a cross section view of the clamp and adjustment mechanism in an open position in an alternative aspect.
Figure 13:
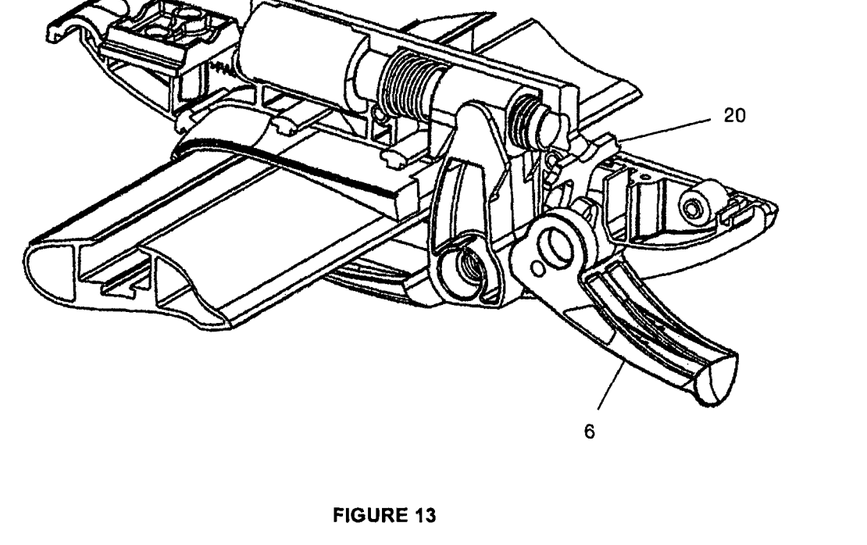
FIG. 13 illustrates a cross section perspective view of the clamp end adjustment mechanism in an open position with the extrusion and other detail removed in an alternative aspect; end

FIGS. 6, 8 and 9 illustrate a cross section view of the clamp 5 housing 7, clamp 5, cross bar 4 and adjustment actuator 6 in an open position where the box 2 or clamp 5 may be moved forwards or backwards relative to one another. As shown, the adjustment actuator 6 communicates with a rocker arm 8 via a cammed surface 9 on the adjustment actuator 6. As the adjustment actuator 6 is closed as shown in FIG. 7, the cammed surface 9 strikes a friction pad 10, forcing the friction pad 10 against an extrusion bar 11 integral to the roof box 2. For added security, a facing pad 12 may be situated to oppose the force of the friction pad 10. When closed, the cammed surface 9 of the adjustment actuator 6 forces the friction pad 10 to bite the extrusion bar 11 and opposing face pad 12 if used which then holds the roof box 2 in place. Conversely, when opened the cammed surface 9 moves away from the friction pad 10 allowing the pad 10 to no longer bite the extrusion 11 and the roof box 2 and/or clamp 5 assembly may be moved back and forth by sliding the adjustment mechanism 1 along the extrusion bar 11.

Advantages of the adjustment mechanism 1 include the ability to quickly and easily datum the spread of the clamps 5 prior to clamping the roof box 2 to the vehicle 3 cross bars 4. A further advantage is that the box 2 position relative to the vehicle 3 cross bars 4 may be adjusted forward and backward without the need to unclamp the box 2 form the cross bars 4. A further advantage is that the adjustments described may be completed without having to open the roof box 2 and access the interior of the box 2.

Figure 14:
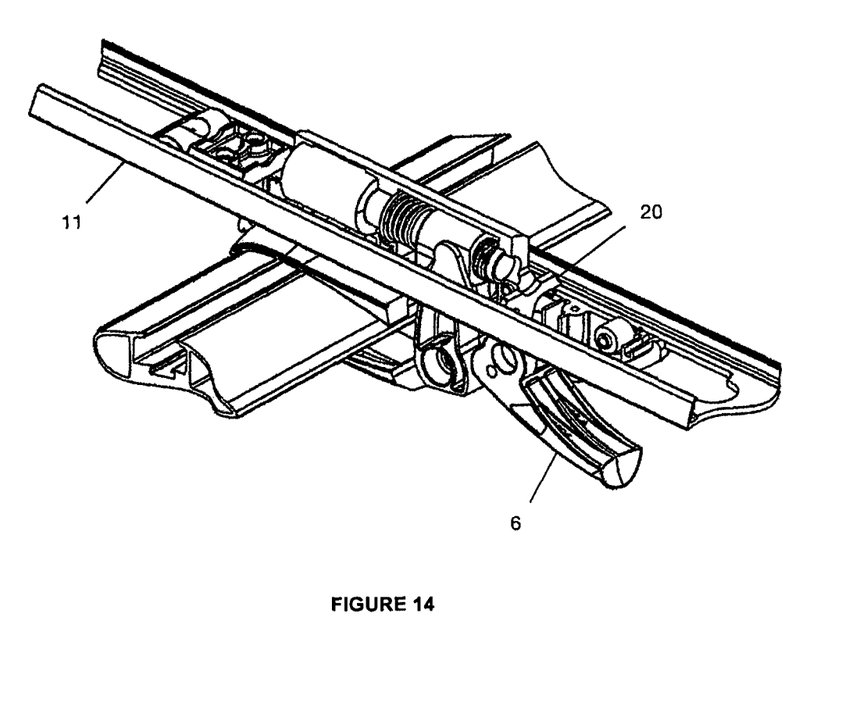
FIG. 14 illustrates a cross section perspective view of the clamp and adjustment mechanism in an open position in an alternative aspect.

FIGS. 10 to 14 illustrate the adjustment mechanism in an alternate aspect. The friction pad 10 (not shown) and the facing pad 12 (not shown) of the previous aspect are replaced by a T-toggle 20 in an over-centre arrangement. As the adjustment actuator 6 is moved to a closed position shown in FIG. 10, the adjustment actuator 6 rotates about a spigot 22 until the T-toggle pivot axis 23 is in an over-centre position relative to the spigot 22 being a fully closed position. In this closed position, the T-toggle 20 is approximately perpendicular to the extrusion bar 11 integral to the roof box (not shown). The T-toggle 20 engages the extrusion bar 11, thereby retaining the adjustment mechanism 1 in position. The T-toggle 20 is shaped such that the T-toggle 20 distributes upward vertical load from the roof box (not shown) to the extrusion bar 11, thus securing the roof box (not shown) to the roof rack (not shown). Conversely, when the actuator 6 is opened, the adjustment actuator 6 rotates about the spigot 22, carrying the T-toggle pivot axis 23 to an over-centre position that biases the adjustment actuator 6 in the open position. In this position, the T-toggle 20 is not approximately perpendicular to the extrusion bar 11 and is thus disengaged from the extrusion bar 11 as shown in FIG. 14, allowing the roof box (not shown) and/or clamp assembly to be moved back and forth by sliding the adjustment mechanism 1 along the extrusion bar 11. A retaining pad 21 may be situated to retain the T-toggle 20 when the adjustment actuator 6 is in an open position.

In the embodiments deathbed above, the roof box may be moved forwards or backwards relative to a vehicle without needing to disengage the roof box from the roof racks or needing to remove the roof box from the vehicle. An example of when this feature may be particularly advantageous is the situation where the roof box is mounted to a vehicle and the vehicle rear door or hatch is not able to be fully opened as the full path of movement is blocked by the roof box. In this situation the user can actuate the adjustment mechanism, push the roof box forwards relative to the car and then fully open the rear hatch door. The alternative embodiment described above where the clamps are moved relative to the roof box may be useful in situations where the user needs to roughly datum or position the clamps relative to the roof rack position.

The aspects described above may also be said broadly to consist in parts, elements and features referred to or indicated in the specification of the application, individually or collectively, and any or all combinations of any two or more said parts, elements or features, and where specific integers are mentioned herein which have known equivalents in the art to which the embodiments relate, such known equivalents are deemed to be incorporated herein as if individually set forth.

Where specific integers are mentioned herein which have known equivalents in the art to which this invention relates, such known equivalents are deemed to be incorporated herein as if individually set forth.

Aspects of the present invention have been described by way of example only and it should be appreciated that modifications and additions may be made thereto without departing from the scope of the claims herein.

What is claimed is:

1. A vehicle roof box apparatus comprising:
   a cargo container having a bottom section and a top section configured to carry cargo on top of a vehicle;
   a plurality of clamping assemblies configured to connect the bottom section of the cargo container to a pair of crossbars, each clamping assembly having a clamp device and an adjustment mechanism, the clamp device being operable from inside the container to grip a crossbar, and
   the adjustment mechanism including an actuator accessed from the exterior of the container that releasably engages and disengages the clamp assembly from the roof box without altering a gripping position of the clamp device relative to a crossbar; and
   wherein, when the actuator is disengaged, the clamp assembly may be moved along the length of the bottom section, and, when the actuator is engaged, the clamp assembly is fixed in position to the bottom section.

2. The roof box apparatus as claimed in claim 1 wherein, when the adjustment mechanism is actuated to disengage the clamp assembly from the roof box, the roof box remains clamped to the roof rack or racks.

3. The roof box apparatus as claimed in claim 1 wherein the movement of the clamp assembly is in the longitudinal direction of the roof box.

4. The roof box apparatus as claimed in claim 3 wherein movement of the roof box is in the longitudinal direction of the roof box.

5. The roof box apparatus as claimed in claim 1 wherein the adjustment mechanism may be disengaged to allow the roof box to be moved relative to the vehicle cross bar or bars.

6. The roof box apparatus as claimed in claim 1 wherein the at least one actuator is at least one lever.

7. The roof box apparatus as claimed in claim 1 wherein the actuator is integral to and accessed from the clamp assembly.

8. A method of adjusting the position of at least one roof box clamp assembly relative to a roof box by use of an adjustment mechanism including:
   a. at least one clamping assembly that engages a roof rack crossbar on a vehicle; and
   b. at least one adjustment mechanism with at least one actuator accessed from the exterior of the roof box that releasably engages and disengages the clamp assembly from the roof box without altering a gripping position of the clamping assembly relative to a crossbar; and
   wherein, when the actuator or actuators are disengaged, the clamp assembly or assemblies can be moved along the length of the roof box and when the actuator or actuators are engaged, the clamp assembly or assemblies are again fixed to the roof box.

9. The method as claimed in claim 8 wherein movement of the clamp assembly is in the longitudinal direction of the roof box.

10. The method as claimed in claim 8 wherein the at least one actuator is at least one lever.

11. The method as claimed in claim 8 wherein the actuator is integral to and accessed from the clamp assembly.

12. A method of adjusting the position of a roof box relative to at least one vehicle cross bar by use of an adjustment mechanism including:
   a. a clamping assembly that engages a roof rack crossbar on a vehicle; and
   b. at least one adjustment mechanism with at least one actuator accessed from the exterior of the roof box that releasably engages and disengages the clamp assembly from the roof box without altering a gripping position of the clamping assembly relative to a crossbar; and
   wherein, when the actuator or actuators are disengaged, the clamp assembly or assemblies remain clamped to the cross bar or bars and the roof box may be moved along its length and when the actuator or actuators are engaged, the clamp assembly or assemblies are again fixed to the roof box.

13. The method as claimed in claim 12 wherein, when the adjustment mechanism is actuated to disengage the clamp assembly from the roof box, the roof box remains clamped to the roof rack or racks.

14. The method as claimed in claim 12 wherein movement of the roof box is in the longitudinal direction of the roof box.

* * * * *